(12) United States Patent
Eichler

(10) Patent No.: US 9,800,480 B1
(45) Date of Patent: Oct. 24, 2017

(54) HOSTED LOAD GENERATOR FRAMEWORK

(71) Applicant: Amazon Technologies, Inc., Seattle, WA (US)

(72) Inventor: Ronnie Allen Eichler, Dallas, TX (US)

(*) Notice: Subject to any disclaimer, the term of this patent is extended or adjusted under 35 U.S.C. 154(b) by 385 days.

(21) Appl. No.: 14/540,849

(22) Filed: Nov. 13, 2014

(51) Int. Cl.
*H04L 12/26* (2006.01)

(52) U.S. Cl.
CPC .................. *H04L 43/065* (2013.01)

(58) Field of Classification Search
CPC ..... H04L 43/067; H04L 43/026; H04L 41/12; H04L 43/04; H04L 43/062; H04L 47/10; H04L 67/10
See application file for complete search history.

(56) References Cited

U.S. PATENT DOCUMENTS

| | | | | |
|---|---|---|---|---|
| 6,601,020 B1* | 7/2003 | Myers | ................ | G06F 11/3414 455/67.14 |
| 2002/0177977 A1* | 11/2002 | Scarlat | ................ | G06F 11/3414 702/186 |

* cited by examiner

*Primary Examiner* — Kim T Nguyen
(74) *Attorney, Agent, or Firm* — Lee & Hayes, PLLC

(57) ABSTRACT

A hosted load generator framework provides functionality for evaluating the availability, reliability, and/or scalability of a network-based service. The framework includes a control service and a load-generating service. The control service provides a control interface through which a request to evaluate the performance of a service may be received. In response to receiving such a request, the control service determines a price for performing the load test. The control service may also cause the load test to be performed on the service under test using the load-generating service. The load-generating service is configured to perform the load test by executing load-generating instances configured to generate requests to the service under test. The load-generating instances also provide data regarding the status of the load test to the control service.

20 Claims, 10 Drawing Sheets

| LOAD-GENERATING CONTROL AND REPORTING UI | | | | | |
|---|---|---|---|---|---|
| VIEWS \| JOBS | | | | | |
| STATUS | REGION | DESIRED RPS | ACTUAL RPS | ERRORS | COMMANDS EXECUTED |
| RUNNING | WEST COAST | 500 | 500 | 3 | 5000 |
| RUNNING | EAST COAST | 250 | 225 | 7 | 4250 |
| RUNNING | EUROPE | 750 | 750 | 12 | 7435 |

404

AVERAGE RESPONSE
TIME 0.03 SECONDS
408

STOP

HOSTED LOAD GENERATOR FRAMEWORK

BACKGROUND

Prior to the deployment of a network-based service, it may be important for the developer of such a service to have a high level of confidence that the service can withstand the network traffic and associated computational load likely to be received by the service when placed into production. For a variety of reasons, however, it can be complex and expensive to simulate the network traffic likely to be received by a production network-based service. This may be especially true for large-scale network-based services that are architected to handle extremely high volumes of requests. Moreover, systems might not scale according to predictive models when under the load of actual requests. As a result, it may be difficult for a developer to test the availability, reliability, and scalability of a network-based service prior to deployment.

The disclosure made herein is presented with respect to these and other considerations.

BRIEF DESCRIPTION OF THE DRAWINGS

FIG. 4 is a screen diagram showing an illustrative UI that displays UI elements that may be used for displaying and/or interacting with information relating to a load test;

DETAILED DESCRIPTION

Figure 1:
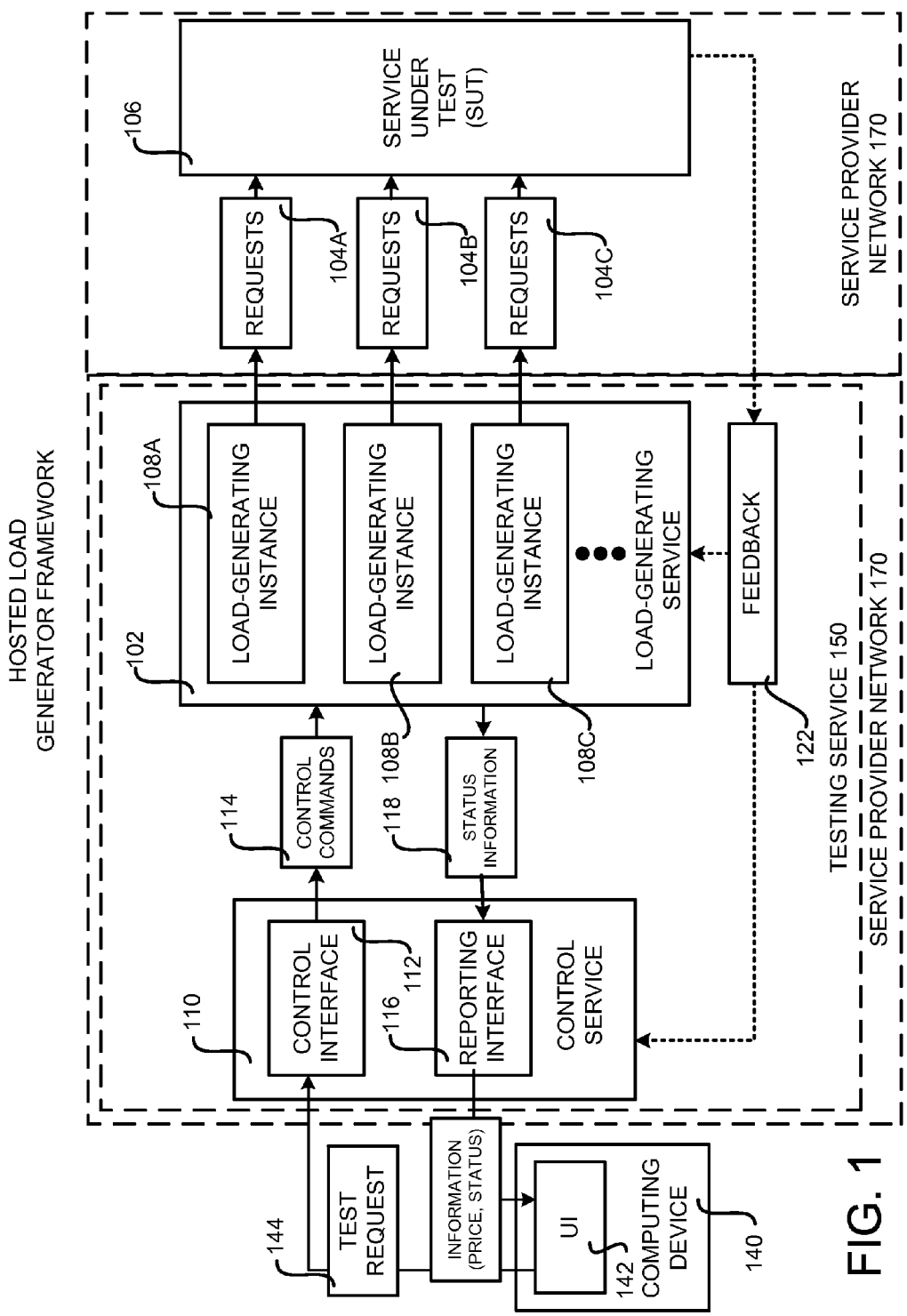
FIG. 1 is a block diagram that illustrates aspects of a configuration and operation of a hosted load generator framework.

The following detailed description is directed to concepts and technologies for providing a hosted load generator framework. Utilizing an implementation of the technologies described herein, a user (e.g., a developer) can receive a fixed price from a testing service to perform a load test on a network-based service. After agreeing to a price to perform the load test, the requestor, or some other user, may use the testing service to perform the load test to evaluate the availability, reliability, and/or scalability of a network-based service. Additionally, by utilizing infrastructure provided by a service provider network to perform the performance evaluation process disclosed herein, even large-scale network-based services can be stress tested at a cost that is likely to be lower than previous solutions. For example, a developer may not need to maintain separate computing devices to perform load tests on the network-based service. Moreover, such testing might be performed regardless of the protocol, or protocols, utilized by the network-based service. The pricing and testing processes described herein might also be utilized to provision computing resources in advance of the deployment to an actual production workload.

In some examples, the hosted load generator framework (which may be referred to herein as "the framework") includes a control service and a load-generating service. As will be described in greater detail below, the control service and the load-generating service may be implemented in a distributed fashion such that the operation of each service is scalable, and such that the failure of components in one service will not cause components in the other service to also fail. The control service and the load-generating service may be executed on the same or different hardware or virtual machine instances. In some examples, the control service and the load-generating service are associated with a service provider network.

According to some configurations, one or more hardware computing devices or virtual machine instances are utilized to implement the control service. The control service may provide a control interface, such as a UI or an application programming interface ("API") such as a Web service API, through which a test request to evaluate the performance of a service (which may be referred to herein as the "service under test" or "SUT") may be received. The test request may be expressed independently of the computing resources configured to provide the load-generating service. In this way, the requestor does not need to be concerned about the configuration and/or operation of the underlying computing resources that are utilized to test the service.

The test request might include various test parameters that are associated with a load test. For example, the test parameters associated with the test request might include, but are not limited to a geographic region from which to perform the load test, a number of users to simulate during the load test, a session time to simulate, a transaction to perform during the load test, and the like. The test parameters might also identify a desired number of requests per time period (e.g. requests per second) that should be submitted to the SUT, as well as data describing the condition, or conditions, under which the load testing should be stopped. For example, conditions may be specified that stop the load test after a specified time period has elapsed or a specified number of requests have been submitted to the SUT.

In response to receiving a test request, the control service may determine the computing resources required to perform the load test and a cost associated with the use of the required computing resources. For example, the control service may determine that some number of load-generating instances are required for a specified period in order to generate the load that meets the conditions specified by the requestor (e.g., number of requests or desired stress level to simulate). Instead of the requestor having to specify the specific computing resources required to perform the load test on the service, the control service, or some other component, may determine the computing resources (e.g., instances and/or hardware) to use based on an availability of the computing resources that may be available at the requested test time.

The control service may use the determined computing resource requirements to generate a fixed price to charge the customer at the particular time desired by the requestor. In some configurations, the control service may generate different prices for different test times. For example, the control service may provide prices for performing the load test at the requested test time as well as for performing the test at other test times (e.g., non-peak times). After determining the price for performing the load test, the control service may provide the price to the requestor (e.g., through a UI). The requestor may accept or reject the price. In some examples, the requestor may accept one of the alternative test prices.

At the designated test time, the control service may perform the load test on the service. In particular, the control service may cause one or more load-generating instances to be executed by the load-generating service to perform the load test according to the specified test parameters (e.g., desired number of requests per time period and/or desired stress level). In some configurations, the load-generating instances are implemented as virtual machine instances. When implemented as virtual machine instances, the load-generating instances might be provided by a service provider operated network-based distributed computing environment (which may be referred to herein as a "service provider network"). Using facilities provided by such a service provider network, virtual machine instances can be provisioned and utilized as-needed to generate requests to the SUT. The virtual machine instances may then be de-provisioned once testing has been completed. By using computing resources for testing the SUT on an as-needed basis, the cost of evaluating the performance of a network-based service can be minimized.

According to some examples, the load-generating service provides data regarding the load test to the control service. For instance, the load-generating service may be configured to provide data to the control service regarding the status of a load test (e.g., number of requests performed, number of errors, average response time) that is currently being performed or has already been performed. The control service might provide an interface, such as a UI or an API, through which data may be retrieved.

According to some configurations, the service being tested may be hosted by the service provider network. For instance, the service being tested may be hosted by the service provider network that implements the testing service that is configured to perform the load test. In these examples, performance data associated with the operation of the service may be monitored and obtained during the load test. The performance data might include data relating to how the different computing resources (e.g., virtual machine instances or hardware resources) used to implement the service are performing, as well as other characteristics about the service (e.g., network traffic). The performance data may be used by the testing service to generate results that are provided to a requesting computing device. In some examples, the results include might include infrastructure recommendations relating to improving the performance of the service as well as forecasts relating to how much load the service might be able to handle. Additional details regarding the various components and processes described above for providing hosted load generator framework will be presented below with regard to FIGS. 1-10.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. As mentioned briefly above, the examples described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific examples. The drawings herein are not drawn to scale. Like numerals represent like elements throughout the several figures (which may be referred to herein as a "FIG." or "FIGS.").

FIG. 1 is a block diagram that illustrates aspects of a configuration and operation of a hosted load generator framework. In some examples, the framework includes a load-generating service 102 and a separate control service 110. In other configurations, a single service or more than two services might be utilized to provide the functionality described herein as being provided by the load-generating service 102 and/or the control service 110. As also described briefly above, one or more hardware computing devices or virtual machine instances may be utilized to implement the control service 110 and/or the load-generating service 102.

The control service 110 may be configured to provide a control interface 112, such as a UI or an API such as a Web service API, through which a test request 144 to evaluate the performance of a SUT 106 may be received. The test request 144 might include various test parameters that are associated with a load test. For example, the test request 144 might include, but is not limited to a geographic region from which to perform the load test, a number of users to simulate during the load test, a session time to simulate, a transaction to perform during the load test, a desired number of requests per time period (e.g. requests per second), data describing the condition, or conditions, under which the testing should be stopped or modified (e.g. a specified time period has elapsed or a specified number of requests have been submitted to the SUT, and the like.

In response to receiving the test request 144 at the control interface 112, the control service 110 may be configured to determine the computing resources required to generate the specified load and to perform the load test. The control service 110 may also be configured to determine the price to charge the requestor for performing the test. As an example, the control service 110 may determine that in order to generate the load to test the service that meets the conditions specified by the requestor (e.g., number of requests or desired stress level to simulate) that some number of load-generating instances 108 are required for a specified period to generate the load. In some cases, the number of load-generating instances 108 that are required is based upon the processing power and the memory associated with an instance. For example, a small instance may be able to perform 1,000 requests/hour whereas a larger sized instance (e.g., more processing power and/or memory) may be able to perform 20,000 requests/hour. The processing capability of an instance might be determined manually or programmatically. For instance, each different sized instance might be tested to determine a number of requests that the instance can perform.

Instead of the requestor having to specify the specific computing resources required to perform the load test, the control service 110 may determine the computing resources to use to perform the load test. In some configurations, the control service 110 determines the price based on an availability of the computing resources of a testing service 150 that will be available at the requested test time. For example, at some test times, the testing service 150 might have larger sized instances available whereas at other test times, the testing service 150 might have smaller sized instances available.

The control service 110 may use the determined availability of the computing resources that may be used to perform the load test along with the required computing resources to generate a fixed price to charge the requestor at the particular time desired by the requestor. In some configurations, the control service may generate different prices for different test times. For example, the control service 110 may provide prices for performing the load test at the request test time as well as for performing the test at other test times (e.g., non-peak times). After determining the price for performing the load test, the control service 110 may provide the price to the requestor. For example, a reporting interface 116 of the control service 110 might be configured to provide the price to a computing device 140 using a UI 142. The requestor may accept or reject the price. In some examples, the requestor may accept an alternative test price provided by the control service 110.

At the designated test time, the control service 110 may cause the load test to be performed to evaluate the performance of the SUT 106. In particular, the control service 110 may provide one or more control commands 114 to the load-generating service 102 to cause one or more load-generating instances 108 to be executed to perform the load test according to the desired specifications (e.g., desired number of requests per time period and/or desired stress level). As discussed briefly above, the load-generating instances 108 might be provided by a service provider operated network-based distributed computing environment (which may be referred to herein as a "service provider network" 170).

Using facilities provided by such a service provider network 170, virtual machine instances can be provisioned and utilized as-needed to generate requests to the SUT 106. The virtual machine instances may then be de-provisioned once the load testing has been completed. By using computing resources for load testing the SUT 106 on an as-needed basis, the cost of evaluating the performance of a network-based SUT 106 might be minimized. Additional details regarding the use of computing resources provided by a service provider network 170 to evaluate the performance of a network-based service will be provided below.

The load-generating instances 108 are configured to generate requests 104A-104C (which might be referred to herein singularly as "a request 104" or collectively as "the requests 104") to the SUT 106. The requests 104 might be requests for the SUT 106 to perform some type of processing (e.g., a transaction), to provide some type of data in response to the request such as a text, image or video file, or other types of requests. The load-generating instances 108 may be configured to communicate with one another, with the control service 110, or with the load-generating service 102 to ensure that a desired number of requests 104 are being provided to the SUT 106. Moreover, additional load-generating instances 108 may be added to the load-generating service 102 until the desired number of requests per time period are being provided to the SUT 106. The load-generating instances 108 may be configured to submit the requests 104 to the SUT until one or more conditions specified by a load-generating job have occurred, or a request to stop testing has been received. The load-generating instances 108 will then stop submitting requests to the SUT 106 and may be de-provisioned.

The control interface 112 might also be configured to receive and provide other types of control commands 114 to the load-generating service 102. For example, the control interface 112 might receive control commands 114 for modifying or stopping a load test. In response to receiving such control commands 114, the load-generating instances 108 in the load-generating service 102 will take appropriate action, such as modifying or stopping testing.

The load-generating instances 108 executed by the load-generating service 102 might also be configured to periodically provide status information 118 regarding the status of each load-generating job to the control service 110. For example, the load-generating instances 108 might be configured to provide status information 118 to the control service 110 indicating a status of a load test. The control service 110 might also provide a reporting interface 116, such as a UI or an API, through which the status information 118 may be retrieved. The status information 118 might include information such as, but not limited to a number of requests performed, a number of errors, an average response time, and the like. FIG. 4 illustrates exemplary status information 118 displayed in a UI.

As shown in FIG. 1, the SUT 106 may be configured to provide feedback 122 to the load-generating service 102 and/or the control service 110. For instance, the SUT 106 might provide feedback 122 to the load-generating service 102 and/or the control service 110 indicating the state of its performance. As a specific example, the SUT 106 might provide feedback 122 indicating that it has exceeded a certain performance threshold (e.g. percentage of memory or central processing unit ("CPU") utilization). Various actions might then be performed in response to receiving the feedback 122. For example, the submission of requests 104 to the SUT 106 might be stopped. Alternately, the volume of requests being submitted to the SUT 106 might be modified based upon the provided feedback 122. In some examples, modifying the load test (e.g., while the load test is being performed on the SUT 106) may change the price of the load test. For instance, increasing the load on the SUT 106 during the load test may cause a price increase. According to some configurations, the price increase is based, at least in part, on the cost of the additional computing resources utilized to perform the load test according to the changed criteria. Other actions might also be taken based upon the feedback 122 provided by the SUT 106. In some implementations the feedback 122 might also indicate that the SUT 106 has scaled its capacity in response to the demand placed upon it by the load-generating service 102. The load-generating service 102 and/or the control service 110 might take various actions based upon receiving this type of feedback from the SUT 106.

According to some configurations, the SUT 106 may be hosted by the service provider network 170. For instance, the SUT 106 may be hosted by the service provider network 170 that also implements the testing service 150. In these examples, performance data associated with the operation of the service may be monitored during the test. For example, the control service 110, the load-generating service 102, or some other component may be configured to monitor performance data associated with the SUT 106 and store the performance data within a data store (not shown).

As briefly described above, the performance data includes data that relates to a performance of the SUT 106 during the load test. Generally, the performance data includes data relating to how the different computing resources (e.g., virtual machine instances or hardware resources) used to implement the SUT 106 are performing, as well as other characteristics about the service. For example, the performance data might include data about how much network traffic is flowing in the SUT 106, how much processing is being performed or is available by the computing resources associated with the SUT 106, how much memory is available or used, how much data storage is available or is used, and the like. The performance data might include any type of data relating to the performance of the SUT 106.

The performance data may be used by the testing service 150 to generate results that are provided to a requesting computing device. In some examples, the results include might include infrastructure recommendations relating to improving the performance of the service as well as forecasts relating to how much load the service might be able to handle. For instance, the infrastructure recommendations might include a recommendation relating to changing to an instance type that has more memory and/or processing power. The infrastructure recommendations might also include recommendations relating to adding computing resources (e.g., additional instances, load-balancers, or content delivery resources), adding network bandwidth, and the like. In some configurations, the infrastructure recommendations identify bottlenecks (e.g., one or more points of congestion or blockage) within the SUT 106 that may be causing the SUT 106 to not perform as well as expected. For example, the performance data may be used to identify that storing data in a database is causing a bottleneck.

The results that are generated by the testing service 150 might also include a forecast relating to how much load the SUT 106 might be able to handle. For example, the performance data might be used to determine a forecast of how many users the SUT 106 may handle during a peak load, how many operations might be performed, and the like. Additional details regarding the configuration and operation of the control service 110 and the load-generating service 102 are described in more detail below.

Figure 2:
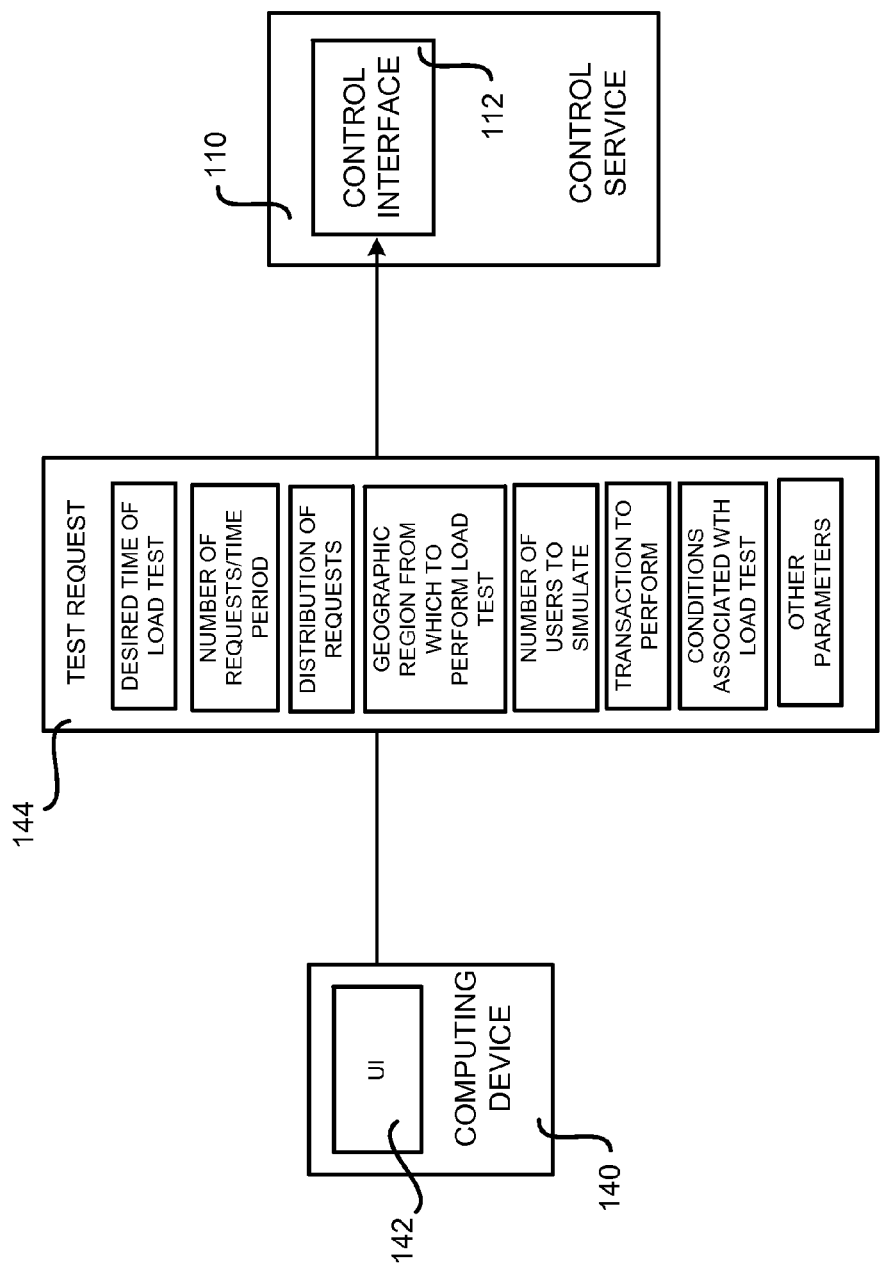
FIG. 2 is a block diagram that illustrates providing an example test request to a control service associated with a load generating service.

FIG. 2 is a block diagram that illustrates providing an example test request 144 to a control service 110 associated with a load generating service 102. As shown in FIG. 2 and described briefly above, the control service 110 may be configured to provide a control interface 112, such as a UI or an API, for receiving the test request 144 that specifies one or more test parameters associated with a load test of a SUT 106.

In some configurations, the test request 144 specifies a desired time of the load test and different test parameters specifying a stress to apply to the service. For example, the test request 144 may include the desired number of requests per time period (e.g. requests per second or other time period) that the load-generating instances 108 are to submit to the SUT 106. In some configurations, the test parameters may include a distribution of requests test parameter that specifies a rate of change for the requests 104. For example, the test request 144 might include a distribution of requests test parameter specifying that the requests 104 be gradually ramped up from zero requests 104 per minute to one thousand requests 104 per minute over the course of an hour during a load test.

The test parameters might further specify that the number of requests 104 then stay constant for some period of time and then be ramped back down to zero requests 104 over the course of some other time period. In this way, a distribution might be specified for the number of requests 104 to be submitted to the SUT 106 over the course of a period of time. In this regard, it should be appreciated that the volume of requests 104 to be delivered to the SUT 106 might also be specified in other ways in other examples.

The test request 144 might also specify one or more geographic regions from which requests 104 are to come (e.g., West Coast, East Coast, North America, South America, Europe, China), a number of users to simulate, one or more transactions to perform, a condition, or conditions, under which the testing should be stopped, as well as other parameters that might be specified. For example, the test request 144 might specify that the requests 104 should be submitted to the SUT 106 for a specified period of time or until a certain number of requests have been submitted to the SUT 106.

Figure 3:
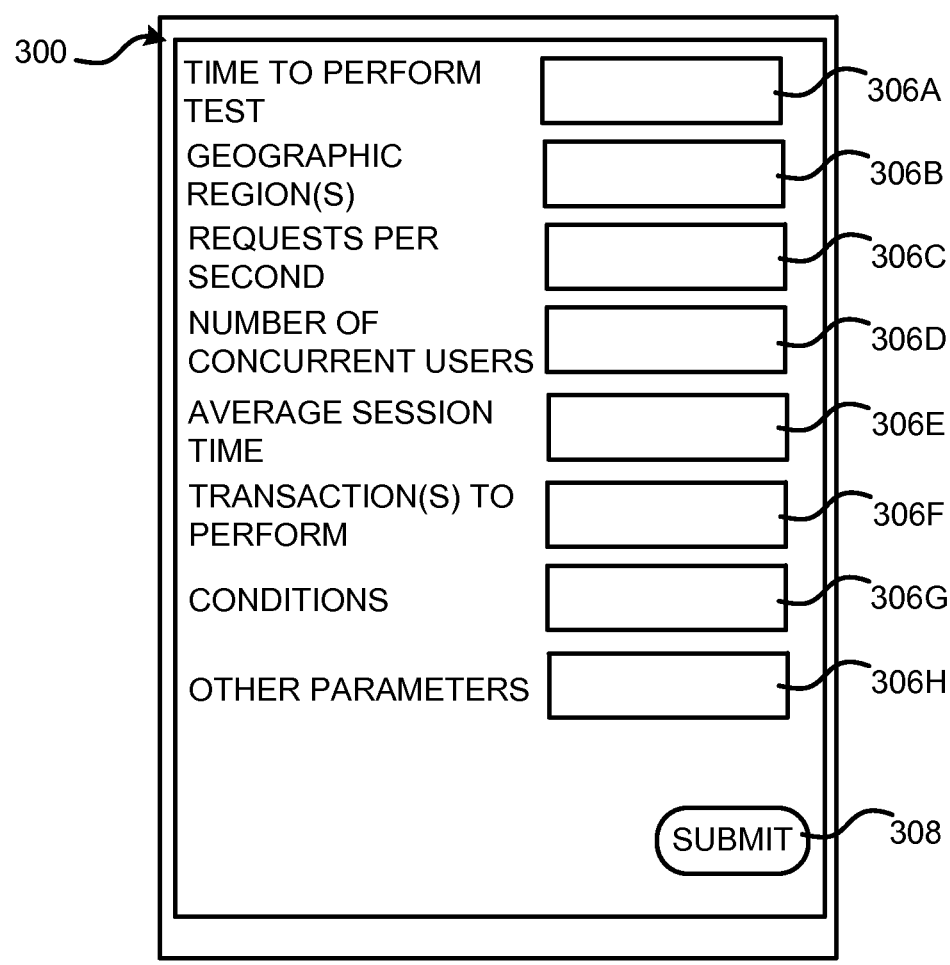
FIG. 3 is a screen diagram showing an illustrative user interface ("UI") that displays UI elements that may be used to set test parameters relating to a load test.

FIGS. 3 and 4 are screen diagrams showing illustrative user interfaces 300 and 400 for requesting a load test and viewing information associated with a load test, respectively. As mentioned briefly above, the control service 110 might provide a UI for requesting a load test. FIG. 3 shows one example UI 300 for providing functionality relating to requesting a load test. Additionally, and as also described briefly above, the control service 110 might also provide a UI for displaying and/or interacting with information relating to a load test being performed, or previously performed, to evaluate the performance of an SUT 106. FIG. 4 shows one example UI 400 for providing this functionality.

The UI 300 shown in FIG. 3 allows a user to specify testing parameters relating to a new load test. The UI 300 might be presented by the control interface 112 in response to receiving a request by a developer, or some other authorized user, to create a new load test. The UI 300 includes a number of fields 306A-306H, respectively, that allow a user to specify a desired time to perform the load test, one or more geographic regions from which to perform the load test, a number of requests per time period (e.g., seconds), the number of concurrent users to simulate during the load test, an average session time, one or more transactions to perform, conditions associated with the test (e.g., ramp up/down time), as well as other parameters that might be associated with the load test.

The UI 300 might also provide fields (not shown in FIG. 3) for allowing a user to specify the conditions under which a load test should be stopped, different times that might be acceptable to perform the load test, and potentially other types of data. Once the user has provided the testing parameters using one or more the fields 306A-306H, the user may select the UI submit button 308. In response to such a selection, a new test request 144 is created and processed in the manner described above.

The UI 400 shown in FIG. 4 includes a number of rows, each of which may correspond to a geographic region and/or specific computing resources used to perform the load test. The UI 400 also includes a number of columns corresponding to test status information for each of the different geographic regions. In the illustrative UI 400 shown in FIG. 4, columns have been provided for displaying the status of each geographic region generating requests to test the service, the name of the geographic region (i.e. West Coast, East Coast, Europe) where requests 104 are coming from, the desired number of requests per time period (e.g. requests per second), the actual number of requests per time period that are being provided to the SUT 106, the number of errors encountered, and the number of commands that have been executed. The content shown in the illustrated columns is merely illustrative and other columns providing other types of information might also be presented. For example, information might be provided relating to an average time to respond to a request, a time to perform a transaction, and the like. Additionally, in other configurations, functionality may be provided for allowing a user to customize the columns that are displayed in the UI 400.

The UI 400 shown in FIG. 4 might also provide functionality for modifying a load test. For instance, a user might be permitted to select and modify the desired requests per time period for each load test reflected in the UI 400. In the example shown in FIG. 4, for instance, a mouse cursor has been utilized to select the field 404. The value shown in the field 404 may then be modified. The modified value may then be propagated to the load-generating service 102 to adjust the load test. The UI 400 might also be configured to allow a user to change other aspects of a load test. For example, a user might select the stop UI button 408 to stop the load test. The UI 300 and the UI 400 shown in FIGS. 3 and 4 are merely illustrative and many different arrangements of UI controls may be utilized to provide the functionality disclosed herein.

Figure 5:
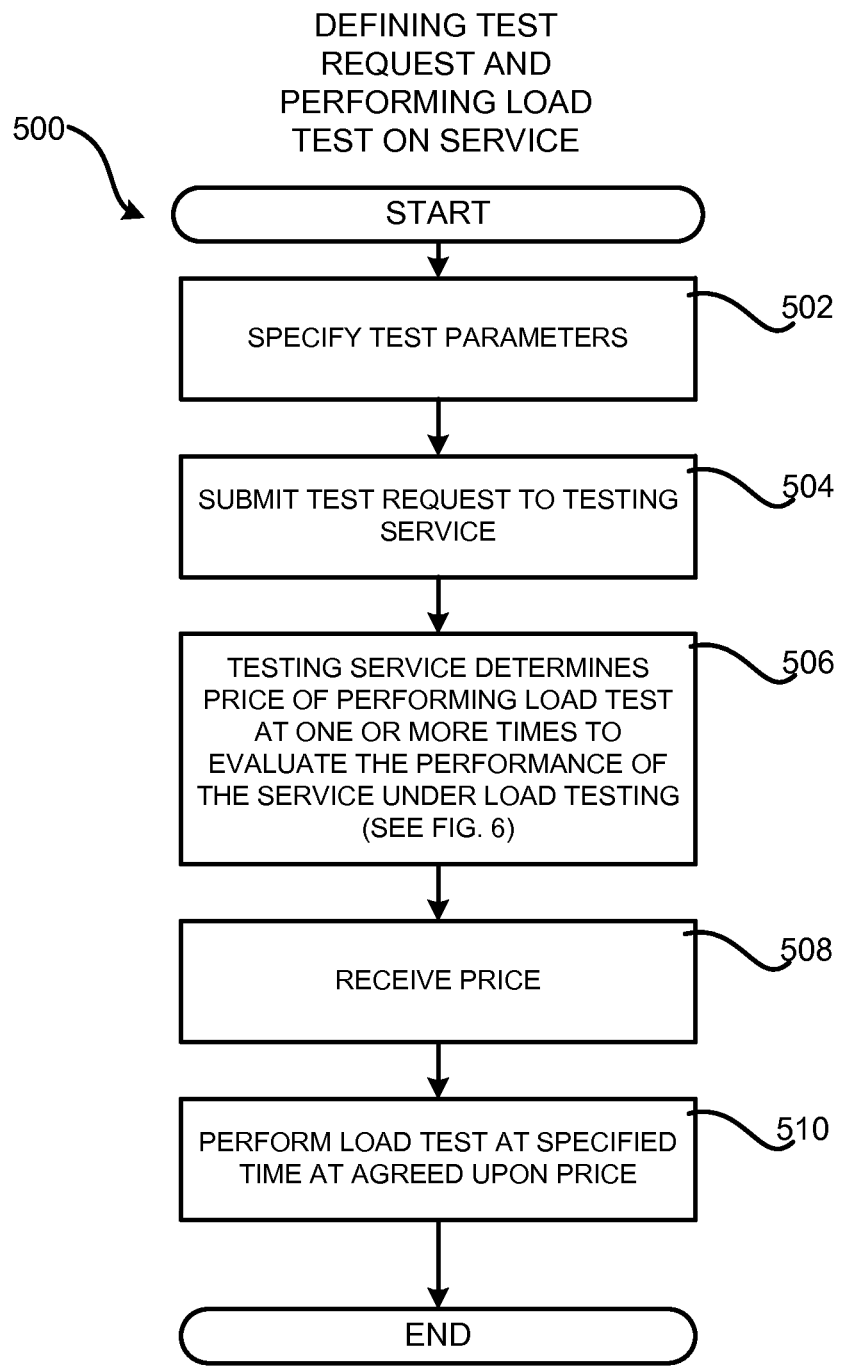
FIG. 5 is a flow diagram showing a routine illustrating aspects of a mechanism disclosed herein for defining a test request and performing a load test on a service utilizing the hosted load generator framework.

FIG. 5 is a flow diagram showing a routine 500 illustrating aspects of a mechanism disclosed herein for defining a test request and performing a load test on a control service utilizing the hosted load generator framework. The logical operations described herein with respect to FIG. 5, FIG. 6 and FIG. 7, and the other figures, may be implemented (1) as a sequence of computer implemented acts or program modules running on a computing system and/or (2) as interconnected machine logic circuits or circuit modules within the computing system. The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. More or fewer operations may be performed than shown in the figures and described herein. These operations may also be performed in parallel, or in a different order than those described herein.

The routine 500 may begin at operation 502, where the test parameters are specified that may be used to specify the conditions associated with the load test. As discussed above, the test parameters may be specified using a UI, such as UI 300, that is configured to specify a desired time to perform the load test, one or more geographic regions from which to perform the load test, a number of requests per time period (e.g., seconds), the number of concurrent users to simulate during the load test, an average session time, one or more transactions to perform, conditions associated with the test (e.g., ramp up/down time), as well as other parameters that might be associated with the load test.

From operation 502, the routine 500 may flow to operation 504 where the test request is submitted to the testing service. As described above, the control interface 112 may be utilized by the user of the computing device 140 to define the test request 144 to define the load test used to evaluate the performance of the SUT 106.

From operation 504, the routine 500 may proceed to operation 506, where the testing service 150 using the control interface 112, or another component within the testing service 150, determines a price for performing the load test based at least, in part, on the test parameters specified by the requestor. As discussed in more detail with regard to FIG. 6, the testing service 150 determines a price to charge the requestor for performing the test based upon the computing resources required to run the load test and the availability of the computing resources to perform the load test at a specified time.

From operation 506, the routine 500 may proceed to operation 508, where the requestor receives the price. As described above, the requestor may receive the price from the control service 110 through the UI 142. The requestor may or may not decide to accept the price.

From operation 508, the routine 500 may proceed to operation 510, where the load test may be performed at the specified time and at the agreed upon price. As discussed above, the load-generating service may execute instances to generate requests 104 to the service under test 106. From operation 510, the routine 500 may proceed to an end operation, where the routine 500 ends.

Figure 6:
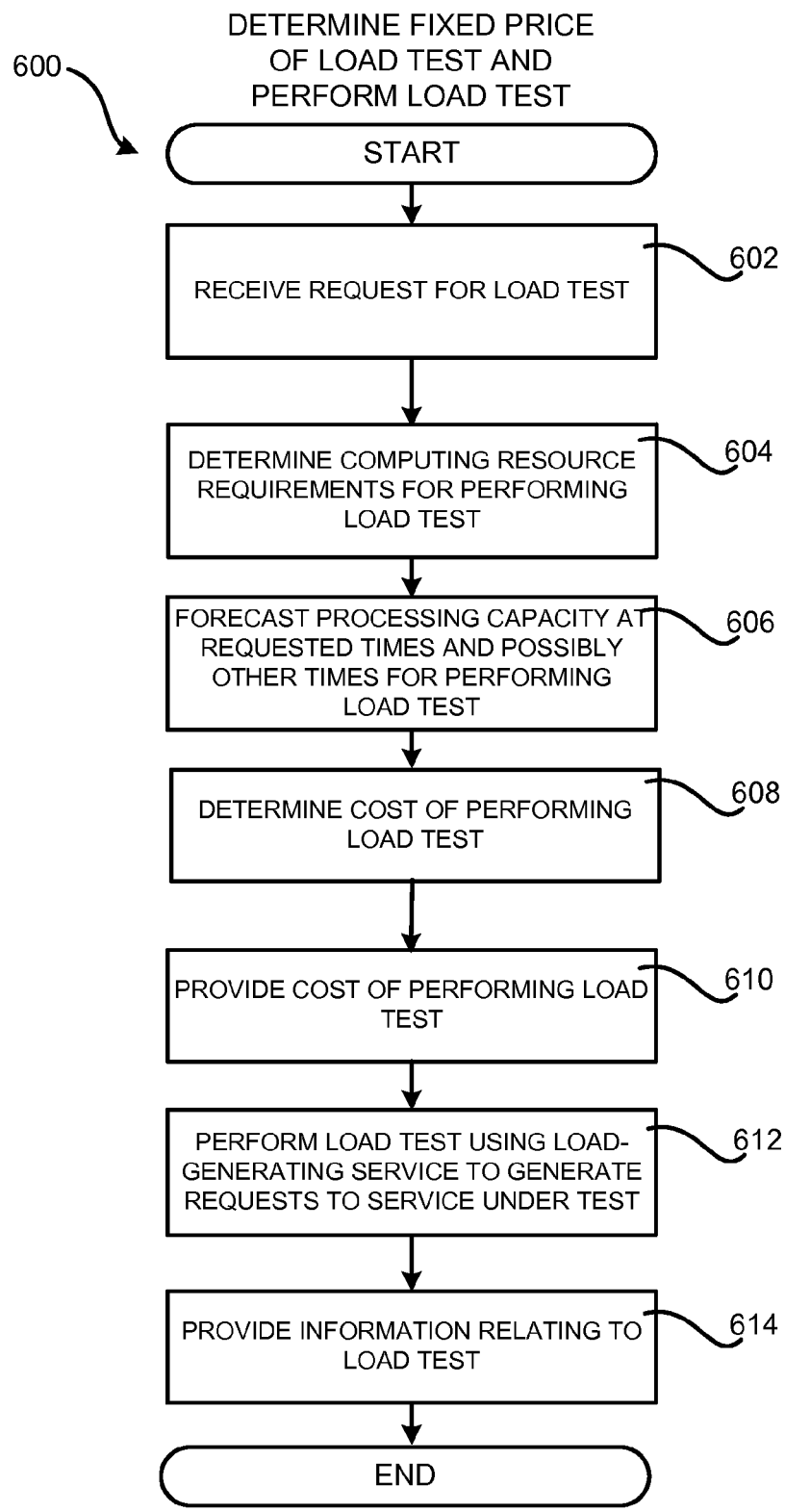
FIG. 6 is a flow diagram showing a routine illustrating aspects of a mechanism disclosed herein for determining a cost of a load test and executing a load test.

FIG. 6 is a flow diagram showing a routine 600 illustrating aspects of a mechanism disclosed herein for determining a cost of a load test and executing a load test. The routine 600 may begin at operation 602, where a test request for a load test is received. As discussed above, the request may be received from a customer computing device 140 and may specify different test parameters associated with the load test.

From operation 602, the routine 600 may proceed to operation 604, where the computing resource requirements for performing the load test are determined. As discussed above, the computing resource requirements may be determined by the testing service 150 based at least, in part, upon the test parameters specified by the requestor. Generally, the computing resource requirements relate to an amount of stress (e.g., number of requests, transactions performed) that is to be placed upon the SUT 106 for some period of time.

From operation 604, the routine 600 may proceed to operation 606, where the processing capacity of the load-generating service 102 is forecasted at one or more requested test times. In some configurations, the processing capacity of the load-generating service 102 might be forecasted for the requested time as well as for other times. In this way, the requestor might be presented with alternative test times that may be less expensive as compared to the requested test time.

From operation 606, the routine 600 may proceed to operation 608, where the cost of performing the load test is determined. As discussed above, the cost may be determined by the testing service 150 based at least, in part, upon on the amount and availability of the computing resources required to perform the load test at the specified time. As also discussed above, the testing service 150 may have different computing resources available at different test times that may affect the price of the load test. For example, when computing resources are readily available the price may be lower as compared to when the computing resources are more scarce.

From operation 608, the routine 600 may proceed to operation 610, where the cost of performing the load test is provided to the requestor. As discussed above, the cost may be provided by the control service 110 to the computing device utilizing the UI 142. According to some configurations, more than one cost option is provided to the requestor.

From operation 610, the routine 600 may proceed to operation 612, where the load test is performed using the load-generating service 102. As discussed above, the load-generating service 102 may utilize one or more load-generating instances 108 to generate the requests to the SUT 106. The load-generating instances 108 are utilized to generate the desired number of requests 104 per time period as well as performing any desired transactions.

From operation 612, the routine 600 may proceed to operation 614, where information may be provided relating to the load test. As described above, the load-generating service 102 may provide data back to the control service 110 relating to the load test that is currently being performed or has already been performed. From operation 614, the routine 600 may proceed to an end operation, where the routine 600 ends.

Figure 7:
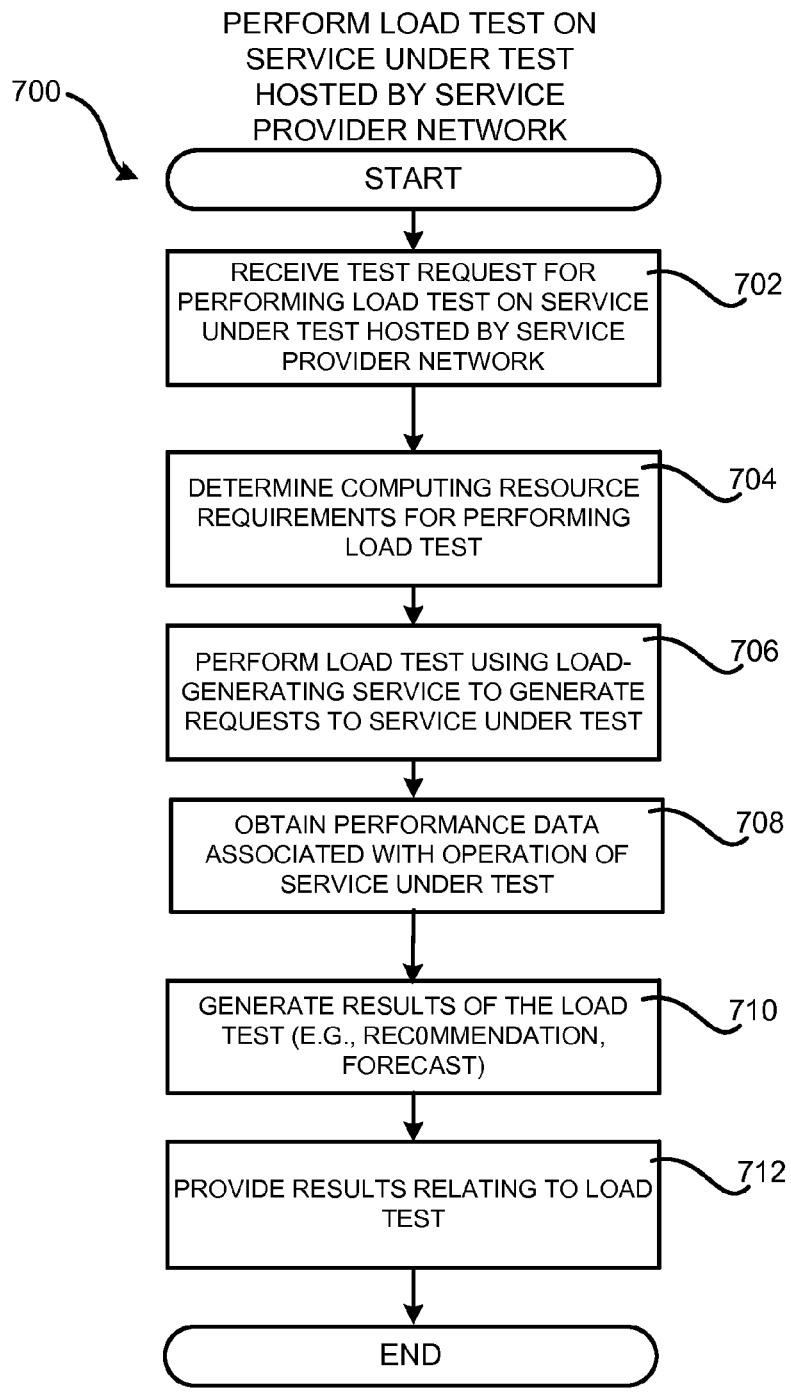
FIG. 7 is a flow diagram showing a routine illustrating aspects of a mechanism disclosed herein for performing a load test on a service under test hosted by a service provider network.

FIG. 7 is a flow diagram showing a routine 700 illustrating aspects of a mechanism disclosed herein for performing a load test on a service under test 106 hosted by a service provider network. The routine 700 may begin at operation 702, where a test request for performing a load test on a SUT 106 that may be implemented by the service provider network 170 is received. As discussed above, the request may be received by the testing service 150 that may be from a customer computing device 140 and may specify different test parameters associated with the load test.

From operation 702, the routine 700 may proceed to operation 704, where the computing resource requirements for performing the load test are determined. As discussed above, the computing resource requirements may be determined by the testing service 150 based at least, in part, upon the test parameters specified by the requestor. Generally, the computing resource requirements relate to an amount of stress (e.g., number of requests, transactions performed) that is to be placed upon the SUT 106 hosted by the service provider network 170 for some period of time.

From operation 704, the routine 700 may proceed to operation 706, where the load test is performed using the load-generating service 102. As discussed above, the load-generating service 102 may utilize one or more load-generating instances 108 to generate the requests to the SUT 106 hosted by the service provider network 170. The load-generating instances 108 are utilized to generate the desired number of requests 104 per time period as well as performing any desired transactions. As discussed herein, the load-generating instances 108 may be provisioned and de-provisioned as needed in an automated fashion. For example, instances used to perform the load testing may be de-provisioned and re-provisioned to perform some other type of processing.

From operation 706, the routine 700 may proceed to operation 708, where performance data may be obtained relating to the load test. As described above, the performance data includes data that relates to a performance of the SUT 106 that is hosted by the service provider network 170.

The performance data might include data relating to how the different computing resources (e.g., virtual machine instances or hardware resources) used to implement the SUT 106 are performing. In some configurations, the performance data might include data about how much network traffic is flowing in the SUT 106, how much processing is being performed or is available by the computing resources of the SUT 106, how much memory is available or used, how much data storage is available or is used, and the like. Generally, the performance data might include any type of data relating to the performance of the SUT 106.

From operation 708, the routine 700 may proceed to operation 710, where results are generated by the testing service 150 relating to the load test on the SUT 106 hosted by the service provider network 170. As described above, the results might include infrastructure recommendations relating to the SUT 106. For example, the infrastructure recommendations might include a recommendation relating to changing to an instance type that has more memory and/or processing power. The infrastructure recommendations might also include recommendations relating to adding computing resources (e.g., load-balancers), adding network bandwidth, and the like. As also discussed above, the infrastructure recommendations may identify bottlenecks within the SUT 106. The results might also include a forecast relating to how much load the SUT 106 might be able to handle. For example, the performance data associated with the performance of the SUT 106 during the load test might be used to determine how many users the SUT 106 may handle during a peak load, how many operations might be performed, and the like.

From operation 710, the routine 700 may proceed to operation 712, where the results relating to the load test are provided. As described above, the testing service 150 may provide the results to the computing device 140 or some other computing device relating to the load test. The results might be provided while the load test is being performed on the SUT 106 and/or after the load test has been performed on the SUT 106. From operation 712, the routine 700 may proceed to an end operation, where the routine 700 ends.

Figure 8:
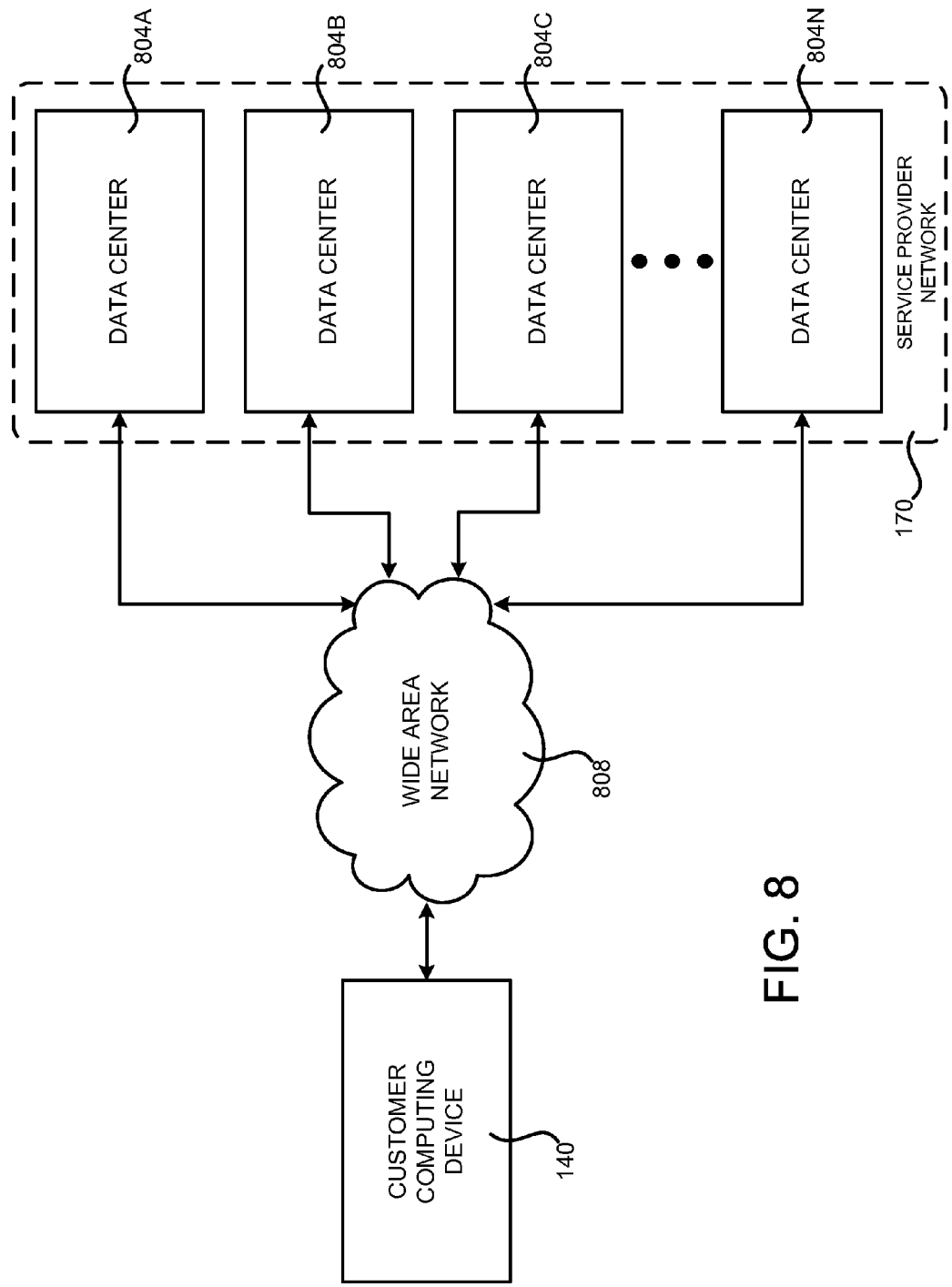
FIG. 8 is a system and network diagram that shows one illustrative operating environment for examples disclosed herein that includes a service provider network that provides functionality for implementing aspects of a hosted load generator framework.

FIG. 8 is a system and network diagram that shows one illustrative operating environment for configurations disclosed herein that includes a service provider network 170 that may be configured to implement virtual machine instances for implementing the control service 110, the load-generating service 102, and/or the SUT 106. As discussed briefly above, the service provider network 170 can provide computing resources on a permanent or an as-needed basis. The computing resources provided by the service provider network 170 may include various types of computing resources, such as data processing resources, data storage resources, networking resources, data communication resources, and the like.

Each type of computing resource provided by the service provider network 170 may be general-purpose or may be available in a number of specific configurations. For example, data processing resources may be available as virtual machine instances in a number of different configurations. The virtual machine instances may be configured to execute applications, including Web servers, application servers, media servers, database servers, and other types of applications, such as those described above. Data storage resources may include file storage devices, block storage devices, and the like. The service provider network 170 might also provide other types of services for purchase and use by customers.

The computing resources provided by the service provider network 170 are enabled in one implementation by one or more data centers 804A-804N (which may be referred to herein singularly as "a data center 804" or in the plural as "the data centers 804"). The data centers 804 are facilities utilized to house and operate computer systems and associated components. The data centers 804 typically include redundant and backup power, communications, cooling, and security systems. The data centers 804 might also be located in geographically disparate locations. One illustrative configuration for a data center 804 that implements aspects of functionality disclosed herein for providing a hosted load generator framework will be described below with regard to FIG. 9.

The customers and other users of the service provider network 170 may access the computing resources provided by the service provider network 170 over a WAN 808. For example, a user of the hosted load generator framework disclosed herein might utilize a Web browser application executing on the customer computing device 140 to submit test requests to evaluate the performance of a SUT 106 to the control interface 112. Similarly, a user might utilize a Web browser application executing on the customer computing device 140 to obtain the status information 118 describing the status of a load test. Although a WAN 808 is illustrated in FIG. 8, it should be appreciated that a local-area network ("LAN"), the Internet, or any other networking topology known in the art that connects the data centers 804 to remote customers and other users may be utilized. It should also be appreciated that combinations of such networks might also be utilized.

The service provider operating the service provider network 170 might also charge a fee for the use of computing resources to a customer that creates and uses the resources. The fee charged for a particular resource might be based upon the type and/or configuration of the resource. The fee charged for a particular resource might also be based upon the amount of time the resource is utilized. For example, in the case of a data processing resource, like a virtual machine instance, the fee for use of the resource might be charged based upon the amount of time the resource is utilized. In the case of a data storage resource, the fee might be computed based upon the amount of data stored and/or the amount of data transferred into or out of the resource. The fees for other types of resources might also be based upon other considerations. A service provider might also utilize various purchasing models to determine the amount to charge a customer for use of resources provided by the service provider.

The various resources described above might also be provisioned and de-provisioned as needed in an automated fashion. For example, a new virtual machine instance might be provisioned in response to determining that a load-generating instance 108 is not capable of providing a desired number of requests 104 to a SUT 106. In this case, a provisioning component (not shown in FIG. 8), or one or more other components within the service provider network 170, might create the new instance of the virtual machine in the service provider network 170. The new virtual machine instance may then be utilized to implement a load-generating instance 108 in the manner described above. In a similar fashion, virtual machine instances might be de-provisioned after the testing of a SUT 106 has been completed. It should be appreciated that computing resources other than virtual machine instances utilized to evaluate the performance of a SUT 106 might be provisioned and de-provisioned in a similar fashion.

Figure 9:
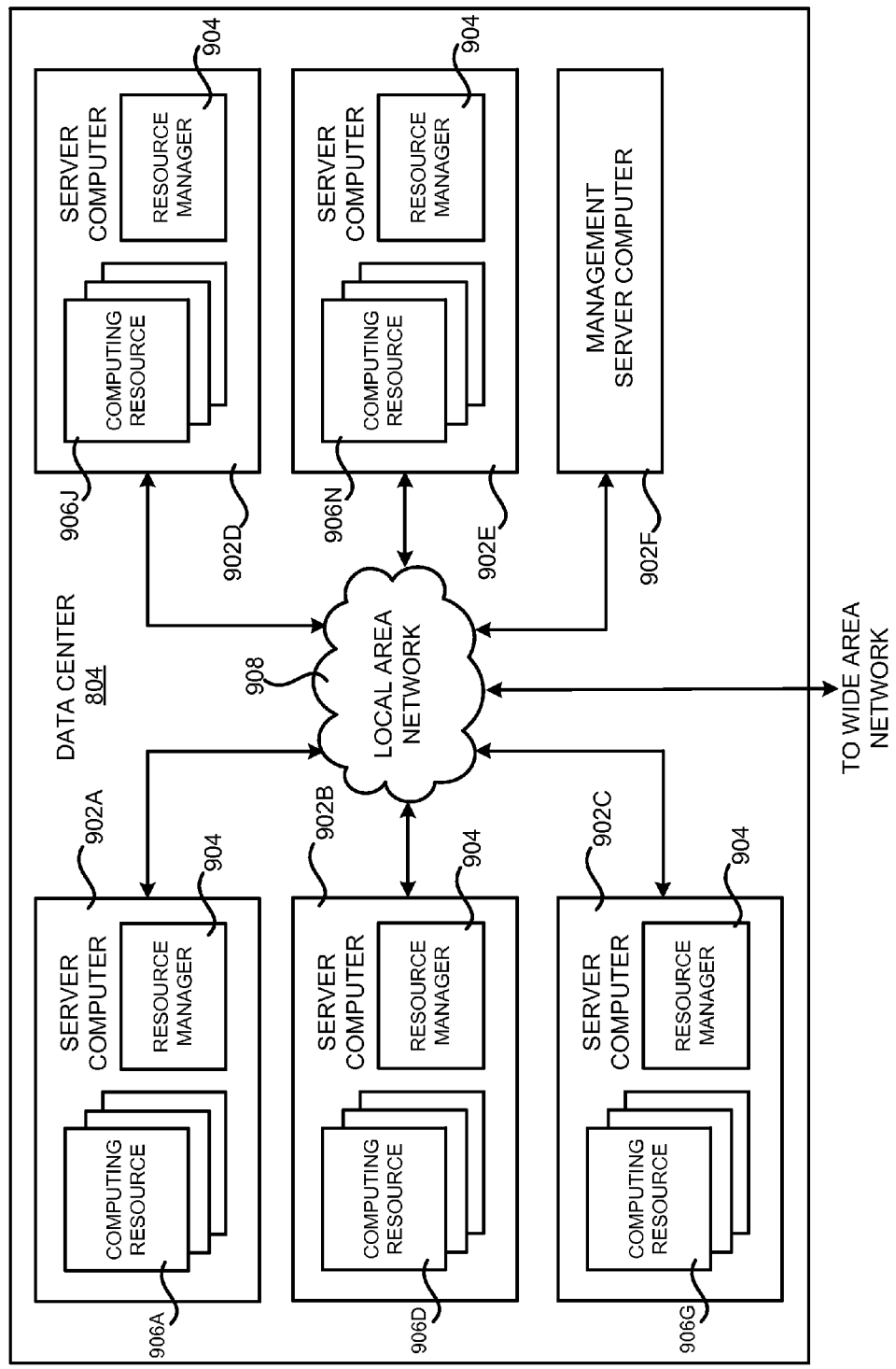
FIG. 9 is a computing system diagram that illustrates a configuration for a data center that may be utilized to implement aspects of the hosted load generation framework disclosed herein.

FIG. 9 is a computing system diagram that illustrates a configuration for a data center 804 that may be utilized to implement aspects of the hosted load generator framework described above. The example data center 804 shown in FIG. 9 includes several server computers 902A-902F (which may be referred herein singularly as "a server computer 902" or in the plural as "the server computers 902") for providing the computing resources described above, such as virtual machine instances.

The server computers 902 may be standard tower or rack-mount server computers configured appropriately for providing the computing resources described herein. For example, in one implementation the server computers 902 are configured to provide computing resources such as data processing resources, data storage resources, database resources, networking resources, and potentially others. Some of the servers 902 might also be configured to execute a resource manager 904 capable of instantiating and/or managing the resources. In the case of virtual machine instances, for example, the resource manager 904 might be a hypervisor or another type of program configured to enable the execution of multiple virtual machine instances on a single server computer 902. The data center 804 shown in FIG. 9 might also include at least one management server computer 902F that is reserved for executing various software components for managing the operation of the data center 804, the server computers 902, and the computing resources described above. Other configurations might also be utilized.

In the example data center 804 shown in FIG. 9, an appropriate LAN 908 is utilized to interconnect the server computers 902A-902F. The LAN 908 is also connected to the WAN 808 illustrated in FIG. 8. It should be appreciated that the configuration and network topology illustrated in FIGS. 1-10 has been greatly simplified and that many more computing systems, networks, and networking devices may be utilized to interconnect the various computing systems disclosed herein and to provide the functionality described above. Appropriate load balancing devices or software modules might also be utilized for balancing a load between each of the data centers 804A-804N, between each of the server computers 902A-902F in each data center 804, and, potentially, between computing resources in each of the data centers 804. It should be appreciated that the data center 804 described with respect to FIG. 9 is merely illustrative and that other implementations might be utilized.

Figure 10:
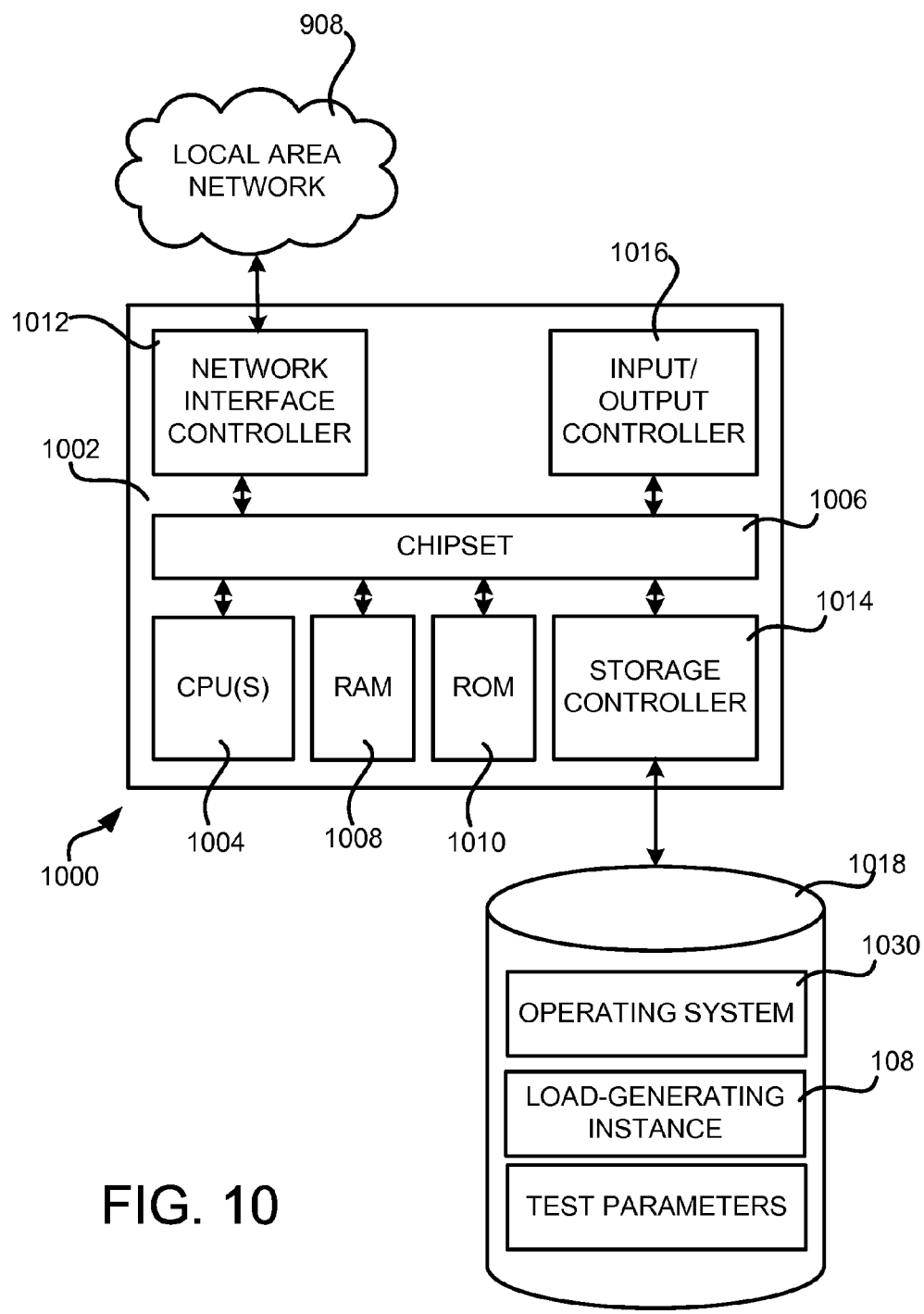
FIG. 10 is a computer architecture diagram showing an illustrative computer hardware architecture for implementing a computing device that might be utilized to implement aspects of the various examples presented herein.

FIG. 10 shows an illustrative computer architecture for a computer 1000 capable of executing the program components described above for providing a hosted load generator framework. The computer architecture shown in FIG. 10 illustrates a conventional server computer, workstation, desktop computer, laptop, tablet, network appliance, personal digital assistant ("PDA"), e-reader, digital cellular phone, or other computing device, and may be utilized to execute any aspects of the software components presented herein. For example, the computer architecture shown in FIG. 10 may be utilized to execute a load-generating instance 108. The computer-architecture shown in FIG. 10 might also be utilized to execute other software components in the control service 110, the load-generating service 102, and, potentially in other services.

The computer 1000 includes a baseboard 1002, or "motherboard," which is a printed circuit board to which a multitude of components or devices may be connected by way of a system bus or other electrical communication paths. In one illustrative example, one or more central processing units ("CPUs") 1004 operate in conjunction with a chipset 1006. The CPUs 1004 may be standard programmable processors that perform arithmetic and logical operations necessary for the operation of the computer 1000. The CPUs 1004 may be configured with one or more processing cores.

The CPUs 1004 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 may provide an interface to a random access memory ("RAM") 1008, used as the main memory in the computer 1000. The chipset 1006 may further provide an interface to a computer-readable storage medium such as a read-only memory ("ROM") 1010 or non-volatile RAM ("NVRAM") for storing basic routines that help to startup the computer 1000 and to transfer information between the various components and devices. The ROM 1010 or NVRAM may also store other software components necessary for the operation of the computer 1000 in accordance with the examples described herein.

The computer 1000 may operate in a networked environment using logical connections to remote computing devices and computer systems through a network, such as the local area network 908. The chipset 1006 may include functionality for providing network connectivity through a NIC 1012, such as a gigabit Ethernet adapter. The NIC 1012 is capable of connecting the computer 1000 to other computing devices over the network 1020. It should be appreciated that multiple NICs 1012 may be present in the computer 1000, connecting the computer to other types of networks and remote computer systems.

The computer 1000 may be connected to a mass storage device 1018 that provides non-volatile storage for the computer. The mass storage device 1018 may store system programs, application programs, other program modules, and data, which have been described in greater detail herein. The mass storage device 1018 may be connected to the computer 1000 through a storage controller 1014 connected to the chipset 1006. The mass storage device 1018 may consist of one or more physical storage units. The storage controller 1014 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1000 may store data on the mass storage device 1018 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 1018 is characterized as primary or secondary storage, and the like.

For example, the computer 1000 may store information to the mass storage device 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 may further read information from the mass storage device 1018 by detecting the physical states or characteristics of one or more particular locations within the physical storage units.

In addition to the mass storage device 1018 described above, the computer 1000 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 1000.

By way of example, computer-readable storage media may include volatile and non-volatile, removable and non-removable media implemented in any method or technology. Computer-readable storage media includes RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 1018 may store an operating system 1030 utilized to control the operation of the computer 1000. According to one example, the operating system comprises the LINUX operating system. According to another example, the operating system comprises the WINDOWS® SERVER operating system from MICROSOFT Corporation. According to further examples, the operating system may comprise the UNIX operating system. It should be appreciated that other operating systems may also be utilized. The mass storage device 1018 may store other system or application programs and data utilized by the computer 1000, such as the test parameters, and/or any of the other software components and data described above. The mass storage device 1018 might also store other programs and data not specifically identified herein.

In one example, the mass storage device 1018 or other computer-readable storage media is encoded with computer-executable instructions which, when loaded into the computer 1000, transform the computer from a general-purpose computing system into a special-purpose computer capable of implementing the examples described herein. These computer-executable instructions transform the computer 1000 by specifying how the CPUs 1004 transition between states, as described above. According to one example, the computer 1000 has access to computer-readable storage media storing computer-executable instructions which, when executed by the computer 1000, perform the various routines described above with regard to FIGS. 5-7. The computer 1000 might also include computer-readable storage media for performing any of the other computer-implemented operations described herein.

The computer 1000 may also include one or more input/output controllers 1016 for receiving and processing input from a number of input devices, such as a keyboard, a mouse, a touchpad, a touch screen, an electronic stylus, or other type of input device. Similarly, the input/output controller 1016 may provide output to a display, such as a computer monitor, a flat-panel display, a digital projector, a printer, a plotter, or other type of output device. It will be appreciated that the computer 1000 may not include all of the components shown in FIG. 10, may include other components that are not explicitly shown in FIG. 10, or may utilize an architecture completely different than that shown in FIG. 10.

Based on the foregoing, it should be appreciated that technologies for providing a hosted load generation framework have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example examples and applications illustrated and described, and without departing from the true spirit and scope of the present invention, which is set forth in the following claims.

What is claimed is:

1. A non-transitory computer-readable storage medium having computer-executable instructions stored thereupon which, when executed by a computer, cause the computer to:
   receive, from a first computer, a test request at a testing service hosted by a service provider network to evaluate a performance of a service under test (SUT) hosted by the service provider network, the request including test parameters specifying one or more conditions for performing a load test on the SUT;
   determine a computing resource requirement to perform the load test on the SUT by determining a number of load-generating instances to execute to generate a target load to the SUT during the load test;
   cause a load-generating service hosted by the service provider network to
      provision the load-generating instances for generating requests to the SUT during the load test,
      cause the load-generating instances to perform load test by generating the requests to the SUT,
      de-provision the load-generating instances following completion of the load test;
   obtain performance data associated with an operation of the SUT during the load test;
   generate results of the load test based, at least in part, on the performance data; and
   provide the results of the load test to the first computer.

2. The non-transitory computer-readable storage medium of claim 1, wherein generating the results of the load test comprises generating a recommendation of one or more infrastructure changes to the SUT.

3. The non-transitory computer-readable storage medium of claim 2, wherein generating the recommendation of one or more infrastructure changes to the SUT comprises identifying computing resources of the SUT identified as a bottleneck using at least a portion of the performance data.

4. The non-transitory computer-readable storage medium of claim 1, wherein generating the results of the load test comprises generating a forecast of a load that the SUT is capable of servicing.

5. The non-transitory computer-readable storage medium of claim 1, having further computer-executable instructions stored thereon that cause the computer to receive test data from the load-generating service, the test data defining a status of the load test, and to provide an interface for accessing at least a portion of the test data and at least a portion of the performance data.

6. A system for evaluating performance of a service under test (SUT), the system comprising:
   one or more computing devices associated with a service provider network configured to host the SUT; and
   one or more computing devices associated with the service provider network configured to provide a testing service, the testing service configured to
      receive a request to perform a load test to evaluate a performance of the SUT,
      cause requests to be generated and submitted to the SUT during the load test by causing one or more load-generating instances configured to generate the requests to be provisioned and executed to generate the requests during the load test, and to be de-provisioned following completion of the load test,
      generate results of the load test based, at least in part, on performance data obtained during the load test that is associated with a performance of the SUT during the load test, and
      provide the results of the load test in response to the request.

7. The system of claim 6, wherein the testing service is further configured to determine a number of instances to execute to generate a target load to the SUT.

8. The system of claim 6, wherein generating the results of the load test comprises generating a recommendation of one or more infrastructure changes to the SUT.

9. The system of claim 8, wherein the recommendation includes identifying a change to an instance type used to implement the SUT.

10. The system of claim 6, wherein generating the results of the load test comprises identifying one or more computing resources of the SUT as one or more points of congestion within the SUT using at least a portion of the performance data.

11. The system of claim 6, wherein generating the results of the load test comprises generating a forecast one or more of a load or a number of users that the SUT is capable of servicing.

12. The system of claim 6, wherein the request identifies test parameters associated with the load test, the test parameters specifying one or more of a geographic region from which to perform the load test, a number of users to simulate, a session time associated with one or more users to simulate, and a transaction to perform during the load test.

13. The system of claim 6, wherein the testing service is further configured to provide an interface for accessing data associated with one or more of a status of the load test and at least a portion of the performance data.

14. The system of claim 6, wherein the testing service is further configured to cause at least one of the one or more load-generating instances to be re-provisioned to perform different processing.

15. A computer-implemented method, comprising:
receiving a request at a testing service associated with a service provider network to perform a load test to evaluate a performance of a service under test (SUT) hosted by the service provider network;
causing a load to be generated and submitted to the SUT during the load test by causing one or more load-generating instances configured to generate the load to be provisioned and executed to generate the load during the load test, and to be de-provisioned following completion of the load test;
generating results of the load test based, at least in part, on performance data obtained during the load test that is associated with a performance of the SUT during the load test; and
providing the results of the load test in response to the request.

16. The method of claim 15, further comprising determining a number of load-generating instances for generating a target load to the SUT.

17. The method of claim 15, wherein generating the results of the load test comprises generating a recommendation of one or more infrastructure changes to the SUT.

18. The method of claim 15, wherein generating the results of the load test comprises identifying computing resources of the SUT identified as a bottleneck using at least a portion of the performance data.

19. The method of claim 15, wherein generating the results of the load test comprises generating a forecast of a load that the SUT is capable of servicing.

20. The method of claim 15, further comprising causing at least one of the one or more load-generating instances to be re-provisioned to perform different processing.

* * * * *